United States Patent Office 3,562,277
Patented Feb. 9, 1971

3,562,277
KETONIC DERIVATIVES OF PHENYL PIPERAZINES
Holger Victor Hansen, Morris Plains, Jerome Marshall Cinnamon, North Caldwell, and William Oroshnik, Plainfield, N.J., assignors to Shulton, Inc., Clifton, N.J., a corporation of New Jersey
No Drawing. Filed Sept. 6, 1967, Ser. No. 665,724
Int. Cl. C07d 51/70
U.S. Cl. 260—268                                8 Claims

ABSTRACT OF THE DISCLOSURE

The compounds of this invention are 1-(alkoxylated-o-amino- and o-nitro-phenyl)-ω-(4-aryl substituted phenyl-1-piperazinyl) ketones and related alkanol and alkane derivatives. The compounds of this invention are central nervous system depressants and may be used as sedatives or tranquilizers. These compounds are also useful as antipyretic agents.

BACKGROUND OF INVENTION

P. A. J. Janssen, in U.S. Pats. 2,997,472 and 2,997,474 discloses 1-(aroylalkyl)-4-arylpiperazines and 1-aryl-ω-(4-arylpiperazine) alkanols, in particular butyrophenone derivatives, and their use as central nervous system depressants. The compounds of this invention containing an o-amino group in the benzene ring not attached directly to the piperazine nitrogen unexpectedly enhances central nervous system depression and temperature lowering effects of the Janssen compounds. The corresponding o-nitro compounds have less central nervous system activity and are useful intermediates in the production of the amino compounds of this invention.

SUMMARY OF INVENTION

This invention relates to new 1-alkyl-4-arylpiperazines and more particularly to novel 1-(2-amino and 2-nitro-phenyl)-ω-(4-phenyl-1-piperazinyl) ketones and the corresponding alkanols and alkanes having the formula:

(I)

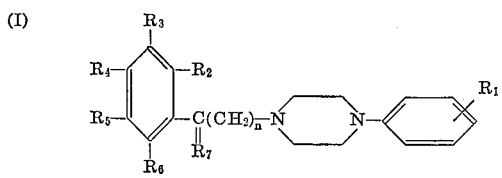

in which $R_1$ is hydrogen, halogen, lower alkyl, or alkoxy perfluorinated lower alkyl, $R_2$ is nitro or amino, $R_3$, $R_4$, $R_5$ and $R_6$ are hydrogen or lower alkoxy, at least one of $R_3$, $R_4$, $R_5$ and $R_6$ being hydrogen, or any two adjacent members of $R_3$, $R_4$, $R_5$ and $R_6$, taken together, are linked as a methylenedioxy group, and $R_7$ is an oxygen atom, a hydrogen atom and a hydroxyl group, or two hydrogen atoms and $n$ is a positive integer having the values 1–9 inclusive. The ketones, alkanols and alkanes of this invention may also be used in the form of their non-toxic, pharmaceutically acceptable acid addition salts of the above compounds.

The lower alkyl and lower alkoxy groups contain one to about four carbon atoms and may be straight or branched chain, such as, methyl, ethyl, n-propyl, ispropyl, secondary butyl and corresponding alkoxy groups; halogen may be fluorine, chlorine or bromine.

In a preferred embodiment of this invention $R_3$, $R_4$, $R_5$ and $R_6$ are hydrogen or methoxy, $R_7$ is an oxygen atom and $n$ has a preferd value of from two to four, inclusive.

The compounds of this invention are useful in causing depression of the central nervous system of mammals in doses of about 0.5 to 300 mg./kg. of body weight. They are effective sedative and tranquilizing agents. These compounds also lower the body temperature of mammals when administered in doses of about 0.5 to 300 mg./kg. of body weight and are effective antipyretic agents.

Compounds of this invention were screened in mice by the Irwin Screening Protocol in accordance with the procedure described in a paper presented at the Postgraduate Course on Animal and Clinical Pharmacological Techniques in Drug Evaluation at Hahnemann Medical College and Hospital of Philadelphia, Feb. 4–15, 1963, published by Year Book Medical Publishers, 1963. The results indicate the compounds are potent central nervous system depressants with neuropharmacological profiles resembling that of chlorpromazine and chlordiazepoxide; the compounds also lower body temperature in this test.

The compounds of this invention, in which $R_2$ is nitro and $R_7$ is an oxygen atom, may be prepared by reacting a piperazine having the formula:

(II)

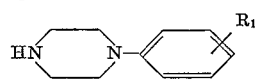

with a ketone having the formula:

(III)

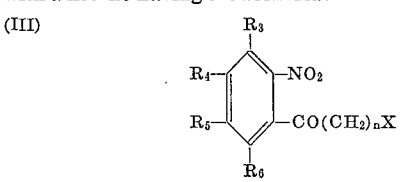

in which X is a radical derived from the anion of a hydrohalic acid such as hydrochloric or hydrobromic acid. This reaction may be conducted at temperature in the range 0–150° C. in a reaction-inert solvent, such as a lower alkyl monohydric alcohol or ester thereof, in the presence of an acid-binding agent, such as an alkali metal carbonate, and a source of the iodide anion, such as an alkali metal iodide, although these measures are not necessary but often serve to facilitate isolation of the product. The product of this reaction is a compound of this invention having the formula:

(IV)

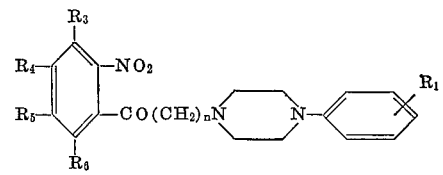

Such a compound may be used advantageously as an intermediate for the production of further compounds of this invention by the use of various reduction procedures to reduce the nitro and/or carbonyl groups.

Thus, reduction of the compound IV, with gaseous hydrogen at ambient temperatures under 2–4 atmospheres pressure in the presence of a metal catalyst such as Raney nickel, furnishes the compounds of this invention having the Formula V:

(V)

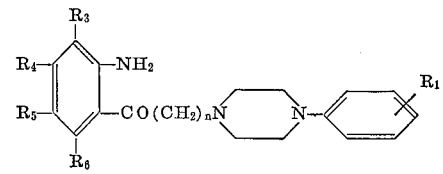

Alternatively, reduction of the compound IV with an alkali metal borohydride, such as sodium borohydride, furnishes the compounds of this invention having the Formula VI:

(VI) 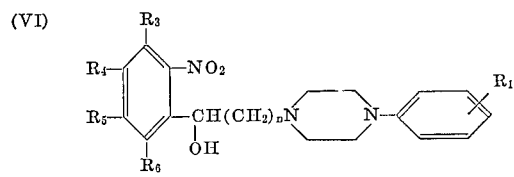

In a further alternative, reduction of the compounds IV, V or VI with gaseous hydrogen at ambient temperatures under 2-4 atmospheres pressure in the presence of a noble metal catalyst such as platinum or palladium furnishes the compounds of this invention having the Formula VII:

(VII) 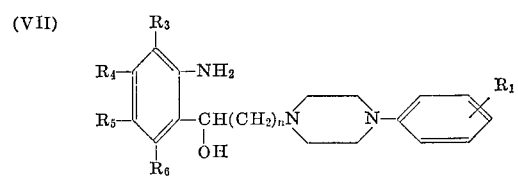

The compounds VII may also be produced by reduction of the compounds V with complex metal hydrides such as sodium borohydride or lithium aluminum hydride.

In a final alternative, reduction of the compounds IV, V, VI or VII with gaseous hydrogen under 2-4 atmospheres pressure, in the presence of a noble metal catalyst, such as platinum or palladium, preferably at elevated temperatures, such as 40–100° C. in the presence of a strong acid, furnishes the compounds of this invention having the formula:

(VIII) 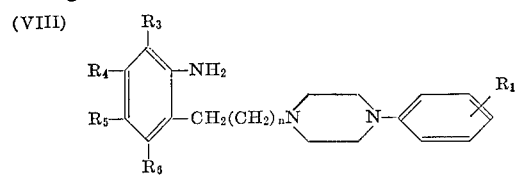

The nitroketones (III), used as intermediates to prepare compounds of this invention, are novel and are conveniently prepared from ketones having the Formula IX:

(IX) 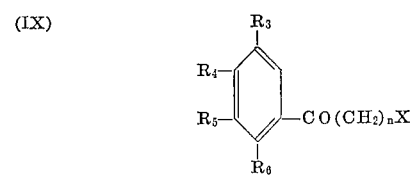

in which X is halogen. The ketones (IX) are reacted with nitric acid, preferably in an acidic solvent such as acetic acid or sulfuric acid, at temperatures in the range −20° to +50° C., and the desired nitro ketones are separated by conventional processes such as fractional crystallization and/or chromatography.

Ketones of Formula IX, in which X is halogen, such as chlorine or bromine, may, in turn, be prepared by the Friedel-Crafts condensation of a substituted acyl halide, having the formula $X(CH_2)_nCOX$, with an alkoxylated benzene derivative, having the formula:

(X) 

in an inert solvent such as carbon disulfide, in the presence of an anhydrous acidic metal halide catalyst, such as aluminum chloride. This is a known method, R. E. Davies and G. Powell [J. Amer. Chem. Soc., 67, 1466 (1945)].

In the ketone (IX) where $n$ is one, acetophenone derivatives have the formula:

(XI) 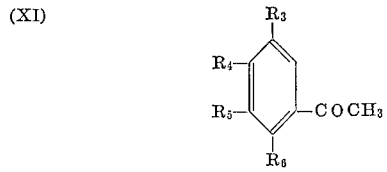

may be nitrated under the above described conditions, to give the nitroketone having the formula:

(XII) 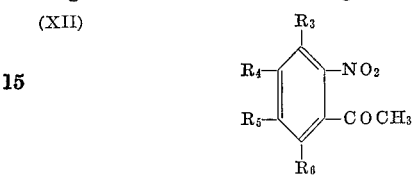

Subsequent treatment of the latter with a halogenating agent, such as bromine, chlorine or N-bromosuccinimide, in an inert solvent such as acetic acid, methylene chloride, or carbon tetrachloride, then furnishes the desired phenacyl halide having the formula:

(XIII) 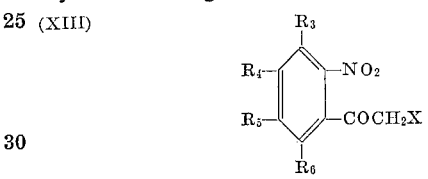

The piperazine derivatives used to prepare the novel compounds of this invention and having the formula:

(II) 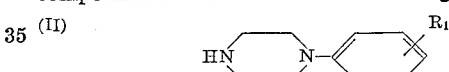

are known compounds, and may be prepared if necessary by the method of C. B. Pollard and T. H. Wicker [J. Amer. Chem. Soc., 76, 1853 (1954)] by the reaction of diethanolamine and an aniline derivative having the formula:

(XIV) 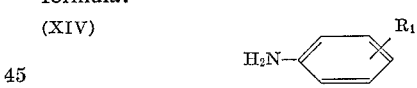

at high temperatures in the presence of mineral acid.

Acid addition salts of the compounds of this invention may be prepared by treatment of the appropriate amine of this invention with one or more stoichiometric equivalents of an inorganic acid such as hydrochloric, hydrobromic, nitric, sulfuric or phosphoric acids, an organic acid such as acetic, succinic, tartaric or citric acids, or a sulfonic acid such as methanesulfonic or p-toluenesulfonic acids, in an inert solvent such as ether, ethyl acetate or benzene. The acid addition salts thus produced may then be obtained by filtration or evaporation of the solvent.

The compounds of this invention and their non-toxic acid addition salts may be administered to mammals orally or parenterally. For this purpose, these compounds may be utilized as sterile solutions or suspensions in water, polyethylene glycol, vegetable oils or other pharmaceutically acceptable vehicles. The compounds may also be administered in tablets, capsules and suppositories and for this purpose may be combined with conventional, pharmaceutically acceptable binders and excipients such as lactose, starch and stearic acid.

DESCRIPTION OF THE PREFERRED EMBODIMENTS

The following examples will further clarify this invention; these examples are given for illustration only and are not meant to limit the scope of this invention in any way. Temperatures are given in degrees centigrade.

EXAMPLE I.—ALKOXYLATED-o-NITROPHENYL ω-(4-ARYL-1-PIPERAZINYL)ALKYL KETONES (A) 4'-5'-dimethoxy-2'-nitro-5-(4-phenyl-1-piperazinyl)-valerophenone A stirred mixture of 5-chloro-4'-5'-dimethoxy-2'-nitro-valerophenone (30 g., 0.10 mole), 1-phenylpiperazine (20 g., 0.12 mole), sodium carbonate (12.5 g., 0.12 mole) and sodium iodide (0.5 g.) in 100 ml. of 2-propanol was refluxed for ca. 18 hours. The hot mixture was filtered. The product precipitated in cooling the filtrate. This crude solid was collected and purified by recrystallization from ethyl acetatehexane, whereupon the product (30 g., 70% yield) was obtained as light yellow needles, M.P. 144–145°.

*Analysis.*—Calc'd for $C_{23}H_{29}N_3O_5$ (percent): C, 64.62; H, 6.84; N, 9.83. Found (percent): C, 64.39; H. 6.90; N, 9.69.

(B) 4'-5'-dimethoxy-2'-nitro-5-[4-(m-chlorophenyl)-1-piperazinyl]valerophenone

Under the conditions cited in Example I(A), 5-chloro-4',5'-dimethoxy-2'-nitrovalerophenone (5 g., 0.017 mole) and 1-(m-chlorophenyl)piperazine (3.65 g., 0.019 mole) furnished 3.6 g. (45%) of the piperazinyl ketone as yellow plates, M.P. 93–95°, from methanol-ether. An analytical sample, recrystallized from the latter solvent, had M.P. 96–97°.

*Analysis.*—Calc'd for $C_{23}H_{28}ClN_3O_5$ (percent): C, 59.80; H, 6.11; Cl, 7.67; N, 9.10. Found (percent): C, 59.67; H, 6.03; Cl, 7.65; N, 9.19.

(C) 4'-5'-dimethoxy-2'-nitro-5-[4-(o-fluorophenyl)-1-piperazinyl]valerophenone

Under the conditions cited in Example I(A), 5-chloro-4',5',dimethoxy-2',nitrovalerophenone (5 g., 0.017 mole) and 1-(o-fluorophenyl)piperazine (3.5 g., 0.019 mole) furnished 4.8 g. (64%) of the appropriate piperazinyl ketone as light yellow needles from methanol, M.P. 129–130.5°.

*Analysis.*—Calc'd for $C_{23}H_{28}FN_3O_5$ (percent): C, 62.01; H, 6.33; F, 4.26; N, 9.43. Found (percent): C. 61.99; H, 6.47; F, 4.45; N, 9.41.

(D) 4',5'-dimethoxy-2'-nitro-5-[4-(o-tolyl)-1-piperazinyl]valerophenone

Under the conditions cited in Example I(A), 5-chloro-4',5'-dimethoxy-2'-nitrovalerophenone (5 g., 0.017 mole) and 1-(o-tolyl)piperazine (3.5 g., 0.020 mole) furnished 5.4 g. (74%) of the appropriate piperazinyl ketone as pale yellow needles from methanol, M.P. 135–136°.

*Analysis.*—Calc'd for $C_{24}H_{31}N_3O_5$ (percent): C, 65.29; H, 7.08; N, 9.52. Found (percent): C, 65.21; H, 7.11; N, 9.48.

(E) 4',5'-dimethoxy-2'-nitro-5-[4-(m-trifluoromethyl)-1-piperazinyl]valerophenone Under the conditions cited in Example I(A), 5-chloro-4',5'-dimethoxy-2'-nitrovalerophenone (5 g., 0.017 mole) and 1-(m-trifluoromethylphenyl)piperazine (4.45 g., 0.019 mole) furnished 4.9 g. (60%) of the appropriate piperazinyl ketone as light yellow needles, M.P. 89–93°, from methanol. An analytical sample, recrystallized from ethyl acetate-hexane, had M.P. 94–96°.

*Analysis.*—Calc'd for $C_{24}H_{28}F_3N_3O_5$ (percent): C, 58.18; H. 5,70; F, 11.50; N, 8.48. Found (percent): C, 58.38; H, 5.78; F, 11.20; N, 8.48.

(F) 4',5'-dimethoxy-2'-nitro-5-[4-(p-methoxyphenyl)-1-piperazinyl]valerophenone

Under the conditions cited in Example I(A), 5-chloro-4',5'-dimethoxy-2'-nitrovalerophenone (5 g., 0.017 mole) and 1-(p-methoxyphenyl)piperazine (3.6 g., 0.019 mole) furnished 4.15 g. (55%) of the appropriate piperazinyl ketone as orange needles from methanol, M.P. 116–117°.

*Analysis.*—Calc'd for $C_{24}H_{31}N_3O_6$ (percent): C, 63.00; H, 6.83; N, 9.18. Found (percent): C, 63.20; H, 6.91; N, 9.07.

(G) 2',4'-dimethoxy-6'-nitro-5-(4-phenyl-1-piperazinyl)-valerophenone

Under the conditions cited in Example I(A), 5-chloro-2',4'-dimethoxy-6'-nitrovalerophenone (2 g., 0.007 mole) and 1-phenylpiperazine (1.5 g., 0.009 mole) furnished 0.5 g. (18%) of the piperazinyl ketone as yellow needles, M.P. 150–153°, from ethyl acetate-hexane.

*Analysis.*—Calc'd for $C_{23}H_{29}N_3O_5$ (percent): C. 64.62; H, 6.84; N, 9.83. Found (percent): C, 6485; H, 6.68; N, 10.11.

(H) 2',5'-dimethoxy-6'-nitro-5-(4-phenyl-1-piperazinyl)-valerophenone

Under the conditions cited in Example I(A), 5-chloro-2',5'-dimethoxy-6'-nitrovalerophenone (2.5 g., 0.008 mole) and 1-phenylpiperazine (1.5 g., 0.009 mole), furnished 0.7 g. (20%) of the piperazinyl ketone as yellow needles, M.P. 123–125°, from ethyl acetate-hexane.

*Analysis.*—Calc'd for $C_{23}H_{29}N_3O_5$ (percent): C, 64.62; H, 6.84; N, 9.83. Found (percent): C, 64.38; H, 7.15; N, 9.59.

(I) 4',5'-dimethoxy-2'-nitro-4-(4-phenyl-1-piperazinyl)butryophenone

Under the conditions cited in Example I(A), 4-chloro-4',5'-dimethoxy-2'-nitrobutyrophenone (7.5 g., 0.026 mole) and 1-phenylpiperazine (5 g., 0.031 mole) furnished 3.6 g. (33%) of the appropriate piperazinyl ketone as golden needles, M.P. 108–110°, from ethyl acetate-hexane. A second crystalline modification, reddish plates of M.P. 88–90°, was also observed on occasion.

*Analysis.*—Calc'd for $C_{22}H_{27}N_3O_5$ (percent): C, 63.91; H, 6.58; N, 10.16. Found (percent): C, 63.92; H, 6.72; N, 10.05.

(J) 4',5'-dimethoxy-2'-nitro-3-(4-phenyl-1-piperazinyl)propiophenone

A stirred mixture of 3-chloro-4',5'-dimethoxy-2'-nitropropiophenone (7 g., 0.026 mole), 1-phenylpiperazine 5 g. 0.031 mole) and sodium carbonate (3 g.) in 40 ml. of 2-propanol was refluxed for ca. 18 hours. The hot mixture was filtered and the filter-cake was extracted with hot ethyl acetate. This extract was diluted with an equal volume of hexane; after cooling, filtration furnished 7.5 g. (73%) of the appropriate piperazinyl ketone, as fine yellow needles, M.P. 143–145°.

*Analysis.*—Calc'd for $C_{21}H_{25}N_3O_5$ (percent): C, 63.15; H, 6.31; N, 10.52. Found (percent): C, 63.45; H, 6.29; N, 10.33.

(K) 4',5'-dimethoxy-2'-nitro-2-(4-phenyl-1-piperazinyl)acetophenone

A solution of 2-bromo-4',5'-dimethoxy-2'-nitroacetophenone (3 g., 0.01 mole) and 1-phenylpiperazine (3.25 g., 0.02 mole) in ethyl acetate (150 ml.) was stirred at room temperature for 4 hours. After removing the precipitated phenylpiperazine hydrobromide by filtration, the solution was evaporated. The residue was recrystallized from ethyl acetate-ether-hexane to give 1.1 g. (29%) of the unstable piperazinyl ketone, an orange powder, M.P. 87–91°.

*Analysis.*—Calc'd for $C_{20}H_{23}N_3O_5$ (percent): C, 62.33; H, 6.01; N, 10.90. Found (percent): C, 62.05; H, 5.82; N, 11.38.

(L) Further nitrophenyl (4-phenyl-1-piperazinyl) alkyl ketones

Under the conditions of Example I(A), the following may also be obtained: 2',4'-dimethoxy-6'-nitro-4-(4-phenyl-1-piperazinyl)butyrophenone from 4-chloro-2',4'-dimethoxy - 6' - nitrobutyrophenone; 2',5' - dimethoxy-6'-nitro-4 - (4 - phenyl - 1 - piperazinyl)butyrophenone from 4-chloro-2',5' - dimethoxy - 6' - nitro - 4 - butyrophenone;

6'-nitro-4-(4-phenyl - 1 - piperazinyl)-2',3',4'-trimethoxybutyrophenone from 4-chloro-6'-nitro-2',3',4'-trimethoxybutyrophenone; 2'-nitro - 4 - (4 - phenyl - 1 - piperazinyl)-4' - propoxybutyrophenone from 4 - chloro - 2' - nitro-4'-propoxybutyrophenone; 4',5'-methylenedioxy-2'-nitro-5-(4-phenyl-1-piperazinyl)valerophenone from 5-chloro-4',5' - methylenedioxy - 2' - nitrovalerophenone; 4',5' - dimethoxy-2'-nitrophenyl 9-(4-phenyl-1-piperazinyl)nonyl ketone from 9-chlorononyl 4',5'-dimethoxy-2'-nitrophenyl ketone.

EXAMPLE II.—ALKOXYLATED-o-AMINOPHENYL ω-(4-ARYL-1-PIPERAZINYL)ALKYL KETONES (A) 2'-amino-4',5'-dimethoxy-5-(4-phenyl-1-piperazinyl)valerophenone A solution of 4',5'-dimethoxy-2'-nitro-5-(4-phenyl-1-piperazinyl)valerophenone (2 g., 0.0047 mole) in 250 ml. of ethyl acetate was reduced under an initial pressure of 50 p.s.i.g., in the presence of 2 g. of Raney nickel at room temperature. When reduction was complete, the catalyst was filtered and the solvent was evaporated from the filtrate. The residue was recrystallized from ethyl acetate-hexane to give 1.1 g. (55%) of the appropriate amino ketone as pale yellow flakes, M.P. 96–98°.

*Analysis.*—Calc'd for $C_{23}H_{31}N_3O_3$ (percent): C, 69.49; H, 7.86; N, 10.57. Found (percent): C, 69.30; H, 7.81; N, 10.41.

The trihydrochloride of this compound was prepared in ethyl acetate and recrystallized from methanol-ethyl acetate, giving a white powder, M.P. 205–215° with decomposition.

(B) 2'-amino-4',5'-[4-(m-chlorophenyl)-1-piperazinyl] valerophenone

Under the conditions cited in Example II(A) reduction of 4',5'-dimethoxy-2'-nitro-5-[4-(m-chlorophenyl)-1-piperazinyl]valerophenone (2.8 g., 0.006 mole) furnished 1.9 g. (72%) of this amino ketone, M.P. 77–81°, as pale yellow flakes from ether-pentane.

*Analysis.*—Calc'd for $C_{23}H_{30}ClN_3O_3$ (percent): C, 63.95; H, 7.00; Cl, 8.21; N, 9.73. Found (percent): C, 64.23; H, 7.10; Cl, 8.16; N, 9.89.

(C) 2'-amino-4',5'-dimethoxy-5-[4-(o-fluorophenyl)-1-piperazinyl]valerophenone

Under the conditions cited in Example II(A) reduction of 4',5'-dimethoxy-2'-nitro-5-[4-(o-fluorophenyl)-1-piperazinyl]valerophenone (4 g, 0.009 mole) furnished 2.75 g. (74%) of this amino ketone as light yellow needles, M.P. 81–82°, from ether-ethyl acetate-pentane.

*Analysis.*—Calc'd for $C_{23}H_{30}FN_3O_3$ (percent): C, 66.48; H, 7.28; F, 4.57; N, 10.11. Found (percent): C, 66.30; H, 7.26; F, 4.36; N, 10.33.

(D) 2'-amino-4',5'-dimethoxy-5-[4-(o-tolyl)-1-piperazinyl]valerophenone

Under the conditions cited in Example III(A) reduction of 4',5'-dimethoxy-2'-nitro-5-[4-(o-tolyl)-1-piperazinyl]valerophenone (4 g., 0.009 mole) furnished 2.2 g. (59%) of this amino ketone as pale yellow needles, M.P. 83–85°, from ethyl acetate-hexane.

*Analysis.*—Calc'd for $C_{24}H_{33}N_3O_3$ (percent): C, 70.05; H, 8.08; N, 10.21. Found (percent): C, 70.03; H, 8.13; N, 10.19.

(E) 2'-amino-4',5'-dimethoxy-5-[4-(m-trifluoromethylphenyl)-1-piperazinyl]valerophenone Under the conditions cited in Example III(A) reduction of 4',5'-dimethoxy-2'-nitro-5-[4-(m-trifluoromethylphenyl)-1-piperazinyl]valerophenone (4 g., 0.0081 mole) furnished 2.8 g. (74%) of this amino ketone as light yellow needles, M.P. 66–68°, from ether-pentane.

*Analysis.*—Calc'd for $C_{24}H_{30}F_3N_3O_3$ (percent): C, 61.92; H, 6.50; F, 12.24; N, 9.03. Found (percent): C, 62.07; H, 6.63; F, 12.04; N, 8.89.

(F) 2'-amino-4',5'-dimethoxy-5-[4-(p-methoxyphenyl)-1-piperazinyl]valerophenone

Under the conditions cited in Example III(A) reduction of 4',5'-dimethoxy-2'-nitro-5-[4-(p-methoxyphenyl)-1-piperazinyl]valerophenone (3.5 g., 0.0077 mole) (73%) furnished this amino ketone as stout, nearly white needles, M.P. 105–106.5°, from ethyl acetate-pentane.

*Analysis.*—Calc'd for $C_{24}H_{33}N_3O_4$ (percent): C, 67.42; H, 7.78; N, 9.83. Found (percent): C, 67.65; H, 7.84; N, 9.94.

(G) 6'-amino-2',4'-dimethoxy-5-(4-phenyl-1-piperazinyl)valerophenone

Under the conditions cited in Example III(A) reduction of 2',4'-dimethoxy-6'-nitro-5-(4-phenyl-1-piperazinyl)valerophenone (1.0 g., 0.0024 mole) furnished 0.35 g. (50%) of this amino ketone, M.P. 47–50°, as a light yellow powder from ethyl acetate-pentane.

*Analysis.*—Calc'd for $C_{23}H_{31}N_3O_3$ (percent): C, 69.49; H, 7.86; N, 10.57. Found (percent): C, 69.19; H, 8.06; N, 10.89.

(H) 6'-amino-2',5'-dimethoxy-5-(4-phenyl-1-piperazinyl)valerophenone

Under the conditions cited in Example II(A) reduction of 2',5'-dimethoxy-6'-nitro-5-(4-phenyl-1-piperazinyl)valerophenone (1.0 g., 0.0024 mole) furnished 0.20 g. (29%) of this amino ketone, M.P. 44–48°, as a yellow powder from ethyl acetate-ether-pentane.

*Analysis.*—Calc'd for $C_{23}H_{31}N_3O_3$ (percent): C, 69.49; H, 7.86; N, 10.57. Found (percent): C, 69.70; H, 8.15; N, 10.92.

(I) 2'-amino-4',5'-dimethoxy-4-(4-phenyl-1-piperazinyl)butyrophenone

Under the conditions cited in Example II(A) reduction of 4',5'-dimethoxy-2'-nitro - 4 - (4-phenyl-1-piperazinyl) butyrophenone (2.5 g., 0.006 mole) furnished 0.8 g. (35%) of this amino ketone as light yellow flakes, M.P. 164–165.5°, from ethyl acetate-hexane.

*Analysis.*—Calc'd for $C_{22}H_{29}N_3O_3$ (percent): C, 68.90; H, 7.62; N, 10.96. Found (percent): C, 69.01; H, 7.66; N, 10.95.

(J) 2'-amino-4',5'-dimethoxy-3-(4-phenyl-1-piperazinyl)propiophenone

Under the conditions cited in Example II(A) reduction of 4',5'-dimethoxy-2'-nitro - 3 - (4-phenyl-1-piperazinyl) propiophenone (3 g., 0.0075 mole) furnished 1.6 g. (57%) of this amino ketone as a light yellow powder, M.P. 87–89°, from ethyl acetate-hexane.

*Analysis.*—Calc'd for $C_{21}H_{27}N_3O_3$ (percent): C, 68.27; H, 7.37; N, 11.37. Found (percent): C, 68.43; H, 7.43; N, 11.30.

The dihydrochloride was obtained as a light yellow powder, M.P. 145–165° with decomposition, from ethanol-ethyl acetate.

*Analysis.*—Calc'd for $C_{21}H_{27}N_3O_3 \cdot 2HCl$ (percent): C, 57.01; H, 6.61; N, 9.50. Found (percent): C, 57.23; H, 6.72; N, 9.23.

(K) 2'-amino-4',5'-dimethoxy-2-(4-phenyl-1-piperazinyl) acetophenone

Under the conditions cited in Example II(A) reduction of 4',5'-dimethoxy-2'-nitro-2-(4-phenyl-1-piperazinyl)acetophenone (2 g., 0.005 mole) furnished this amino ketone as an unstable yellow oil. This was converted to the dihydrochloride salt (0.5 g., 23%), a yellow powder, M.P. 172–185° with decomposition, from ethanol-ether.

*Analysis.*—Calc'd for $C_{20}H_{25}N_3O_3 \cdot 2HCl$ (percent): C, 56.09; H, 6.34; N, 9.81; Cl, 16.56. Found (percent): C, 55.78; H, 6.52; N, 9.62; Cl, 16.92.

(L) Further aminophenyl (4-phenyl-1-piperazinyl)alkyl ketones

Under the conditions of Example II(A) the following may also be obtained:

6′-amino-2′,4′-dimethoxy-4-(4-phenyl-1-piperazinyl)butyrophenone from 2′,4′-dimethoxy-6′-nitro-4-(4-phenyl-1-piperazinyl)butyrophenone;

6′-amino-2′,5′-dimethoxy-4-(4-phenyl-1-piperazinyl)butyrophenone from 2′,5′-dimethoxy-6′-nitro-4-(4-phenyl-1-piperazinyl)butyrophenone;

6′-amino-4-(4-phenyl-1-piperazinyl)-2′,3′,4′-trimethoxybutyrophenone from 6′-nitro-4-(4-phenyl-1-piperazinyl)-2′,3′,4′-trimethoxybutyrophenone;

2′-amino-4-(4-phenyl-1-piperazinyl)-4′-propoxybutyrophenone from 2′-nitro-4-(4-phenyl-1-piperazinyl)-4′-propoxybutyrophenone;

2′-amino-4′,5′-methylenedioxy-5-(4-phenyl-1-piperazinyl)valerophenone from 4′,5′-methylenedioxy-2′-nitro-5-(4-phenyl-1-piperazinyl)valerophenone;

2′-amino-4′,5′-dimethoxyphenyl 9-(4-phenyl-1-piperazinyl)nonyl ketone from 4′,5′-dimethoxy-2′-nitrophenyl 9-(4-phenyl-1-piperazinyl)nonyl ketone.

EXAMPLE III.—1-(4,5-DIMETHOXY-2-NITROPHENYL) - 5 - (4-PHENYL-1-PIPERAZINYL) 1-PENTANOL

A solution of 4′,5′ - dimethoxy - 2′-nitro-5-(4-phenyl-1-piperazinyl-valerophenone (5 g., 0.012 mole) in ethanol (75 ml.) was heated for 4 hours with sodium borohydride (1.5 g.). After cooling, the mixture was diluted with an equal volume of water. The crude product was filtered and recrystallized from 2-propanol to give 3.15 g. (63%) of the nitro alcohol as small brownish-yellow needles, M.P. 156–158°.

Analysis.—Calc'd for $C_{23}H_{31}N_3O_5$ (percent): C, 64.32; H, 7.28; N, 9.78. Found (percent): C, 64.28; H, 7.32; N, 9.65.

EXAMPLE IV.—1-(2-AMINO-4,5-DIMETHOXYPHENYL) - 5 - (4-PHENYL-1-PIPERAZINYL) 1-PENTANOL

A solution of 2′-amino-4′,5′-dimethoxy-5-(4-phenyl-1-piperazinyl) valerophenone (2.5 g., 0.006 mole) in ethanol (50 ml.) was reduced by the procedure of Example III. After dilution with water, the product was obtained as a gum and converted to the hydrochloride salt, a tan powder, M.P. 195–205° with decomposition. On treatment with alkali, this salt furnished the amino alcohol free base (0.4 g. 16%) as very pale yellow flakes, M.P. 103–104.5°, from ethyl acetate-hexane.

Analysis.—Calc'd for $C_{23}H_{33}N_3O_3$ (percent): C, 69.14; H, 8.32; N, 10.52. Found (percent): C, 69.24; H, 8.16; N, 10.40.

EXAMPLE V.—1-(2-AMINO-4,5-DIMETHOXYPHENYL) - 5 - (4-PHENYL-1-PIPERAZINYL) PENTANE

A solution of 2′-amino-4′,5′-dimethoxy-5-(4-phenyl-1-piperazinyl)valerophenone (2.5 g., 0.006 mole) in ethanol (250 ml.) containing concentrated hydrochloric acid (5 ml.) was reduced under an initial pressure of 50 p.s.i.g. in the presence of 5% palladium-on-carbon catalyst (1 g.) for 18 hours at 50–60°. The mixture was cooled, filtered and evaporated. The residual semisolid hydrochloride was recrystallized from ethanol-ethyl acetate, then converted to the free base with alkali. This pentane derivative was obtained as a yellow powder from pentane, M.P. 39–43°.

Analysis.—Calc'd for $C_{23}H_{33}N_3O_2$ (percent): C, 72.03; H, 8.67; N, 10.96. Found (percent): C, 71.86; H, 8.87; N, 10.72.

EXAMPLE VI

The composition of the invention may be combined with pharmaceutically acceptable carriers to produce desired dosage unit forms. For example, 2′-amino-4′,5′-dimethoxy-5-(4-phenyl-1-piperazinyl)valerophenone hydrochloride may be produced in different dosage unit forms, such as different types of tablets, capsules and injectables.

The following is a tablet formulation which may be utilized in situations in which the presence of water is not desirable or may contribute to the instability of the resulting tablet.

| | Mg. |
|---|---|
| 2′-amino-4′,5′-dimethoxy-5-(4-phenyl-1-piperazinyl) valerophenone hydrochloride | 30 |
| Lactose | 50 |
| Starch | 85 |
| Ethyl cellulose 5% sol. | 15 |
| Magnesium stearate | 2 |
| Total | 200 |

The 2′ - amino - 4′,5′ - dimethoxy - 5 - (4 - phenyl - 1-piperazinyl)valerophenone hydrochloride may be uniformly mixed with lactose and a portion of the starch (25 mg.). The binder, ethyl cellulose, may be prepared by making a 5% solution in anhydrous ethyl alcohol. The mixture containing the ketone may be granulated with the ethyl cellulose solution. Anhydrous ethyl alcohol may be added at this stage to obtain satisfactory wet granules. The mixture may be wet screened through an appropriate size screen, for example #8 stainless steel screen, and the granulations may be dried at room temperature. The mixture may then be dry screened through #20 stainless steel screen. The remaining starch, talc and magnesium stearate are incorporated by mixing thoroughly with the other ingredients. The mixture may then be incorporated in tablets.

This following formulation makes use of a typical "wet" granulation procedure:

| | Mg. |
|---|---|
| 2′-amino-4′,5′-dimethoxy-5-(4-phenyl-1-piperazinyl) valerophenone hydrochloride | 30 |
| Starch | 70 |
| Acacia | 10 |
| Lactose | 88 |
| Magnesium stearate | 2 |
| Total | 200 |

The ketone, part of the starch and part of the acacia may be mixed uniformly. A paste may be prepared with the remaining portion of the starch and acacia and this paste may be employed to granulate the mixture containing the ketone. The resulting granulate may be wet screened through an appropriate size screen and dried at room temperature. It may then be dry screened and any remaining starch together with lactose and magnesium stearate may be added to the dry granulation. All ingredients may then be thoroughly mixed and the resulting mixture may be compressed into tablets.

The following formulation utilizes as a granulation procedure, the "pre-compression" or "slugging" method. Such procedure should be conducted in the absence of water and nonaqueous liquids. The formulation is as follows:

| | Mg. |
|---|---|
| 2′-amino-4′,5′-dimethoxy-5-(4-phenyl-1-piperazinyl) valerophenone hydrochloride | 30 |
| Lactose | 98 |
| Talc | 30 |
| Magnesium stearate | 2 |
| Starch | 40 |
| Total | 200 |

The ketone, lactose, talc and 50% of the starch may be thoroughly mixed. The mixture may be compressed into "slugs" using a ¾ inch punch. The compressed "slugs" may be oscillated through an appropriate size screen (either #14 or #16). To the resulting dry granulation the remaining starch together with magnesium stearate may be added. The complete granulation may be mixed until uniform and the tablets may be compressed.

Tabletting when a small percentage of active ketone is incorporated may be achieved by direct compression. Several methods are available for this purpose. Two methods are illustrated in this example.

One illustration of direct compression is the following formulation:

| | Mg. |
|---|---|
| 2'-amino-4',5'-dimethoxy-5-(4-phenyl-1-piperazinyl) valerophenone hydrochloride | 30 |
| Spray dried lactose | 158 |
| Starch | 10 |
| Magnesium stearate | 2 |
| Total | 200 |

The spray dried lactose, the magnesium stearate and the ketone may be mixed uniformly and then compressed directly into tablets.

Another method of direct compressed tablet involves the utilization of commercially available mixtures such as that sold under the name Emcompress, manufactured by Edward Mendell Co. This mixture has all the necessary ingredients of the tablet, such as the diluent, disintegrant and lubricant added to it. A typical formula of Emcompress is as follows:

| | Parts |
|---|---|
| Dicalcium phosphate, dihydrate | 89.0 |
| Starch, U.S.P. | 7.5 |
| Magnesium stearate | 1.0 |
| Microcrystalline cellulose | 2.5 |
| Total | 100.0 |

The ketone may be incorporated in the Emcompress as in the following formulation:

| | Mg. |
|---|---|
| 2'-amino-4',5'-dimethoxy-5-(4-phenyl-1-piperazinyl) valerophenone hydrochloride | 30 |
| Emcompress | 160 |
| Landalgine P–HS | 10 |
| Total | 200 |

Capsules are also a convenient and at times advantageous dosage form. Hard and soft gelatin capsules may be used. Usually the active material such as the ketone may be mixed with a suitable quantity of lactose until uniform and the capsules may be either filled by hand or by suitable machinery.

One suitable capsule formula is as follows:

| | Mg. |
|---|---|
| 2'-amino-4',5'-dimethoxy-5-(4-phenyl-1-piperazinyl) valerophenone hydrochloride | 30 |
| Lactose, q.s. to 300. | |

An injectable dosage form may be prepared by dissolving or suspending the ketone in a suitable vehicle, such as pyrogen free water or an oil base. Such vehicle should meet official governmental specifications.

With water based vehicles, sodium chloride may be added to obtain an isotonic solution. Procaine hydrochloride may be added as a local anesthetic to minimize irritation, and a suitable preservative may be added. Such a preservative may be, for example, benzyl alcohol, methyl and propyl parabens, benzalkonium chloride (1:10,000), phenyl mercuric nitrate (1:50,000) or suitable mixtures of such preservatives.

A typical injectable formulation is:

2'-amino-4',5'-dimethoxy-5-(4-phenyl-1-piperazinyl) valerophenone hydrochloride—30 mg.
Procaine hydrochloride—10 mg.
Sodius chloride for isotonicity—Q.s.
Benzalkonium chloride—1:10,000.
Water for injection—Q.s. to 1.0 ml.

To prepare such injectables, procaine hydrochloride benzalkonium chloride, sufficient sodium chloride to obtain isotonicity and finally the ketone may be added together. The product may be manufactured under sterile conditions, filtered and filled into suitable containers, either single dose ampules or multi-dose vials.

ALKOXYLATED-o-NITROPHENYL ω-HALOALKYL KETONES

The alkoxylated-o-nitrophenyl ω-halo ketones utilized for the preparation of alkoxylated-o-nitrophenyl ω-(4-aryl-1-piperazinyl)alkyl ketones of Example I are new compounds. The preparation of these starting materials is described below:

(A) 5-chloro-4',5'-dimethoxy-2'-nitrovalerophenone

To a stirred solution of nitric acid (sp. gr. 1.48, 75 ml.) and acetic acid (75 ml.) was added 5-chloro-3',4'-dimethoxyvalerophenone (15 g., 0.059 mole), at a temperature of −5° to −10°. After stirring a further 30 minutes, the reaction was quenched with a large volume of ice-water. The product was filtered and recrystallized from ethyl acetate-hexane, giving the nitro ketone (12 g., 68%) as pale yellow needles, M.P. 113–114°.

*Analysis.*—Calc'd for $C_{13}H_{16}ClNO$ (percent): C, 51.75; H, 5.35; Cl, 11.75; N, 4.64. Found (percent): C, 51.76; H, 5.18; Cl, 11.68; N, 4.46.

(B) 5-chloro-2',4'-dimethoxy-6'-nitrovalerophenone

Under the conditions cited in Section A, 5-chloro-2',4'-dimethoxyvalerophenone (5 g., 0.02 mole) furnished 1 g. (22%) of this nitro ketone as yellow needles, M.P. 95.5–97°, from ethyl acetate-hexane.

*Analysis.*—Calc'd for $C_{13}H_{16}ClNO_5$ (percent): C, 15.75; H, 5.35; Cl, 11.75; N, 4.64. Found (percent): C, 51.98; H, 5.41; Cl, 11.82; N, 4.69.

(C) 5-chloro-2',5'-dimethoxy-6'-nitrovalerophenone

Under the conditions cited in Section A, 5-chloro-2',5'-dimethoxyvalerophenone (10 g., 0.04 mole) furnished 2.8 g. (24%) of this nitro ketone as yellow needles, M.P. 85–87°, from ethyl acetate-hexane.

*Analysis.*—Calc'd for $C_{13}H_{16}ClNO_5$ (percent): C, 51.75; H, 5.35; Cl, 11.75; N, 4.64. Found (percent): C, 52.03; H, 5.29; Cl, 11.52; N, 4.48.

(D) 4-chloro-4',5'-dimethoxy-2'-nitrobutyrophenone

Under the conditions cited in Section A, 4-chloro-3',4'-dimethoxybutyrophenone [C. van den Westeringh et al., Ind. Chim. Belge. 25, 1073 (1960)] (12.5 g., 0.052 mole) furnished 10.3 g. (70%) of this nitro ketone as pale yellow needles, M.P. 93–95°, from aqueous ethanol.

*Analysis.*—Calc'd for $C_{12}H_{14}ClNO_5$ (percent): C, 50.10; H, 4.90; Cl, 12.32; N, 4.87. Found (percent): C, 50.33; H, 4.91; Cl, 12.56; N, 4.84.

(E) 3-chloro-4',5'-dimethoxy-2'-nitropropiophenone

Under the conditions cited in Section A, 3-chloro-3',4'-dimethoxypropiophenone [R. E. Davies and G. Powell, J. Amer. Chem. Soc., 67, 1466 (1945)] (10 g., 0.044 mole) furnished 9.6 g. (80%) of this nitro ketone as fine yellow needles, M.P. 120–122°, from aqueous ethanol.

*Analysis.*—Calc'd for $C_{11}H_{12}ClNO_5$ (percent): C, 48.28; H, 4.42; Cl, 12.95; N, 5.12. Found (percent): C, 48.49; H, 4.44; Cl, 12.76; N, 5.27.

(F) 2-bromo-4',5'-dimethoxy-2'-nitroacetophenone

Bromine (11 g., 0.063 mole) was slowly added to a warm stirred solution of 4',5'-dimethoxy-2'-nitroacetophenone [R. Robinson, et al., J. Chem. Soc., 125, 653 (1924)] (15 g., 0.061 mole) in methylene chloride (150 ml.). The mixture was then washed with bicarbonate and evaporated. Recrystallization of the residue from ethyl acetate-hexane furnished 15.3 g. (75%) of the bromination product as bright yellow, stout needles, M.P. 155–157.5°.

*Analysis.*—Calc'd for $C_{10}H_{10}BrNO_5$ (percent): C, 39.50; H, 3.31; Br, 26.28; N, 4.61. Found (percent): C, 39.66; H, 3.37; Br, 26.56; N, 4.53.

(G) Further nitrophenyl haloalkyl ketones

Under the conditions of Section A, the following may also be obtained: 4-chloro-2',4'-dimethoxy-6'-nitrobutyrophenone from 4-chloro-2',4'-dimethoxybutyrophenone (C. van den Westeringh et al., loc. cit.); 4-chloro-2',5'-dimethoxy-6'-nitrobutyrophenone from 4-chloro-2',5'-dimethoxybutyrophenone (C. van den Westeringh, et al., loc. cit.); 4-chloro-6'-nitro-2',3',4'-trimethoxybutyrophenone from 4-chloro-2',3',4'-trimethoxybutyrophenone (C. van den Westeringh, et al., loc. cit.); 4-chloro-2'-nitro-4' - propoxybutyrophenone from 4 - chloro - 4' - propoxybutyrophenone (C. van den Westeringh, et al., loc cit); 5 - chloro - 4',-5' - methylenedioxy - 2' - nitrovalerophenone from 5 - chloro - 4',5' - methylenedioxyvalerophenone; 9-chlorononyl 4',5'-dimethoxy-2'-nitrophenyl ketone from 9-(bromo and chloro)nonyl 3',4'-dimethoxyphenyl ketone.

ALKOXYLATEDPHENYL ω-HALOALKYL KETONES

Some of the ketonic starting materials utilized for the preparation of the alkoxylated-o-nitrophenyl ω-haloalkyl ketones are new compounds. The preparation of these starting materials is described below:

(A) 5-chloro-3',4'-dimethoxyvalerophenone

To a stirred suspension prepared from veratrole (27.5 g., 0.2 mole) and anhydrous aluminum chloride (35 g., 0.26 mole) in carbon disulfide, 5-chlorovaleryl chloride (30 g., 0.19 mole) was gradually added, while the temperature was held at 10°. The resulting mixture was heated slowly to 40° held at this temperature for one hour, and quenched in ice-water. The product was extracted into benzene. The benzene extract was washed with alkali and evaporated; the residue, on trituration with pentane, solidified, giving 35 g. (70%) of the chloro ketone, M.P. 44–48°. An analytical sample produced by recrystallization from pentane was obtained as fine white needles, M.P. 46–47°.

*Analysis.*—Calc'd for $C_{13}H_{17}ClO_3$ (percent): C, 60.82; H, 6.67; Cl, 13.81. Found (percent): C, 60.83; H, 6.76; Cl, 13.89.

(B) 5-chloro-2',4'-dimethoxyvalerophenone

Under the conditions cited in Section A, 1,3-dimethoxybenzene (25 g., 0.18 mole) was converted to 30.8 g. (67%) of this chloro ketone, obtained as white plates, M.P. 56–57°, from hexane.

*Analysis.*—Calc'd for $C_{13}H_{17}ClO_3$ (percent): C, 60.82; H, 6.67; Cl, 13.81. Found (percent): C, 60.68; H, 6.59; Cl, 14.01.

(C) 5-chloro-2',5'-dimethoxyvalerophenone

Under the conditions cited in Section A, 1,4-dimethoxybenzene (25 g., 0.18 mole) was converted to 12.8 g. (27%) of this ketone, obtained as white needles, M.P. 44.5–45.5°, from heptane.

*Analysis.*—Calc'd for $C_{13}H_{17}ClO_3$ (percent): C, 60.82; H, 6.67; Cl, 13.81. Found (percent): C, 60.54; H, 6.66; Cl, 14.11.

(D) Further alkoxylated phenyl ω-haloalkyl ketones

By the method of Section A, e.g. methylenedioxybenzene may be converted to 5-chloro-3',4'-methylenedioxyvalerophenone; 10-bromodecanoic acid and veratrole may be converted to 10-bromo (and/or chloro) nonyl 3',4'-dimethoxyphenyl ketone.

What is claimed is:

1. A compound selected from the class consisting of 1 - (2 - amino) - ω - (4 - phenyl - 1 - piperazinyl) ketones and the pharmaceutically acceptable acid addition salts thereof, said ketones having the formula:

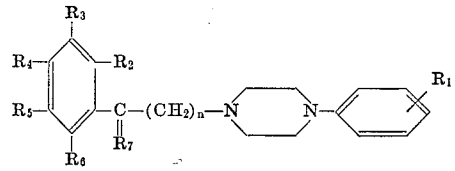

in which $R_1$ is hydrogen, fluorine or lower alkyl; $R_2$ is amino; $R_3$, $R_4$, $R_5$, and $R_6$ are hyrogen or lower alkoxy; at least one of $R_3$, $R_4$, $R_5$ and $R_6$ being lower alkoxy, or any two adjacent members of $R_3$, $R_4$, $R_5$ and $R_6$, taken together, are linked as a methylenedioxy group; $R_7$ is oxygen; and $n$ is a positive integer having the value 1–9 inclusive.

2. A compound in accordance with claim 1, said compound being 2' - amino - 4',5' - dimethoxy - 5 - (4 - phenyl-1-piperazinyl)valerophenone.

3. A compound in accordance with claim 1, said compound being 2' - amino - 4',5' - dimethoxy - 5 - [4 - (o-fluorophenyl)-1-piperazinyl]-valerophenone.

4. A compound in accordance with claim 1, said compound being 6' - amino - 2',4' - dimethoxy - 5 - (4 - phenyl-1-piperazinyl) valerophenone.

5. A compound in accordance with claim 1, said compound being 6' - amino - 2',5' - dimethoxy-5-(4-phenyl-1-piperazinyl)-valerophenone.

6. A compound in accordance with claim 1, said compound being 2' - amino - 4',5' - dimethoxy - 4 - (4 - phenyl-1-piperazinyl) butyrophenone.

7. A compound in accordance with claim 1, said compound being 2' - amino -4', 5' - dimethoxy - 3 - (4 - phenyl-1-piperazinyl) propiophenone.

8. A compound in accordance with claim 1, said compound being 2' - amino - 4',5' - dimethoxy - 2-(4 - phenyl-1-piperazinyl)acetophenone.

References Cited

UNITED STATES PATENTS

| | | | |
|---|---|---|---|
| 2,997,472 | 8/1961 | Janssen I | 260—268 |
| 2,997,474 | 8/1961 | Janssen II | 260—268 |
| 3,007,928 | 11/1961 | Parcell | 260—268 |
| 3,170,926 | 2/1965 | Ash | 260—268 |
| 3,426,036 | 2/1969 | Biel et al. | 260—268X |
| 3,448,192 | 6/1969 | Mauvernay | 260—268X |

DONALD G. DAUS, Primary Examiner

U.S. Cl. X.R.

260—346.2, 592, 688, 689, 690; 424—250